(12) United States Patent
Tong et al.

(10) Patent No.: US 10,291,315 B1
(45) Date of Patent: May 14, 2019

(54) METHODS AND SYSTEMS FOR OPERATING A HIGH THROUGHPUT SATELLITE

(71) Applicant: Asia Satellite Telecommunications Company Limited, Wanchai (HK)

(72) Inventors: Roger Shun Hong Tong, New Territories (HK); Fred Chun Yin Vong, New Territories (HK); Harry Yin Chung Leung, New Territories (HK); Hai Hu, New Territories (HK); Man Hei Chan, New Territories (HK); Kat Fan Yip, New Territories (HK)

(73) Assignee: Asia Satellite Telecommunications Company Limited, Wanchai (HK)

( * ) Notice: Subject to any disclaimer, the term of this patent is extended or adjusted under 35 U.S.C. 154(b) by 0 days.

(21) Appl. No.: 15/997,399

(22) Filed: Jun. 4, 2018

(51) Int. Cl.
*H04B 7/185* (2006.01)
*H04W 16/28* (2009.01)

(52) U.S. Cl.
CPC ..... *H04B 7/18513* (2013.01); *H04B 7/18578* (2013.01); *H04W 16/28* (2013.01)

(58) Field of Classification Search
CPC .................. H04B 7/185–7/2041; H04W 16/28
See application file for complete search history.

(56) References Cited

U.S. PATENT DOCUMENTS 10,111,109 B2 * 10/2018 Hreha .................... H04W 16/28
2017/0366263 A1 * 12/2017 Turgeon ............... H04B 10/118

* cited by examiner

*Primary Examiner* — Raymond S Dean
(74) *Attorney, Agent, or Firm* — Hanley, Flight & Zimmerman, LLC

(57) ABSTRACT

A high throughput satellite and a method of operating a high throughput satellite. The satellite has multiple modes of operation and transitions between them in response to the spectrum fill rate. Modes of operation may include altering color re-use patterns to increase or reduce number of colors, using intra-beam geographic sub-division, or precoding downlink signals.

26 Claims, 13 Drawing Sheets

US 10,291,315 B1

METHODS AND SYSTEMS FOR OPERATING A HIGH THROUGHPUT SATELLITE

TECHNICAL FIELD

The present application relates to satellite communications, and more particularly to methods and systems for operating a high throughput satellite (HTS).

BACKGROUND

Conventional fixed-service satellite (FSS) systems use one or more large wide beams to cover a large geographic area. Modern satellite communication is moving away from FSS towards HTS systems in which the satellite employs a large number of narrow spot beams and relies on color re-use to improve throughput at each beam. HTS is considered particularly attractive because it enables higher throughput for both uplink and downlink, and modern satellite communication needs place a greater emphasis on two-way traffic, i.e. both uplink and downlink to end equipment, such as for satellite-based mobile internet.

Color re-use is one way to reduce inter-beam interference, but use of a high number of colors may result in limited bandwidth being allocated to each spot beam. This may lead to quickly exhausting the satellite capacity, particularly for downlink transmission as that tends to be higher demand. Lower color re-use can improve bandwidth available but at a cost of higher inter-beam interference. Higher inter-beam interference adversely impacts the achievable throughput of the system and may also lower spectrum efficiency. Accordingly, conventional HTS systems are implemented with a fixed color re-use pattern that attempts to balance these factors. Typically, this is a four color re-use pattern.

Accordingly, it would be advantageous to have improved methods and systems operating HTS systems and, in particular, techniques to manage and balance spectrum demand, interference problems, and spectrum efficiency so as to enable improved throughput.

BRIEF DESCRIPTION OF THE DRAWINGS

Reference will now be made, by way of example, to the accompanying drawings which show example embodiments of the present disclosure, and in which.

Like reference numerals are used in the drawings to denote like elements and features.

DETAILED DESCRIPTION

Figure 1:
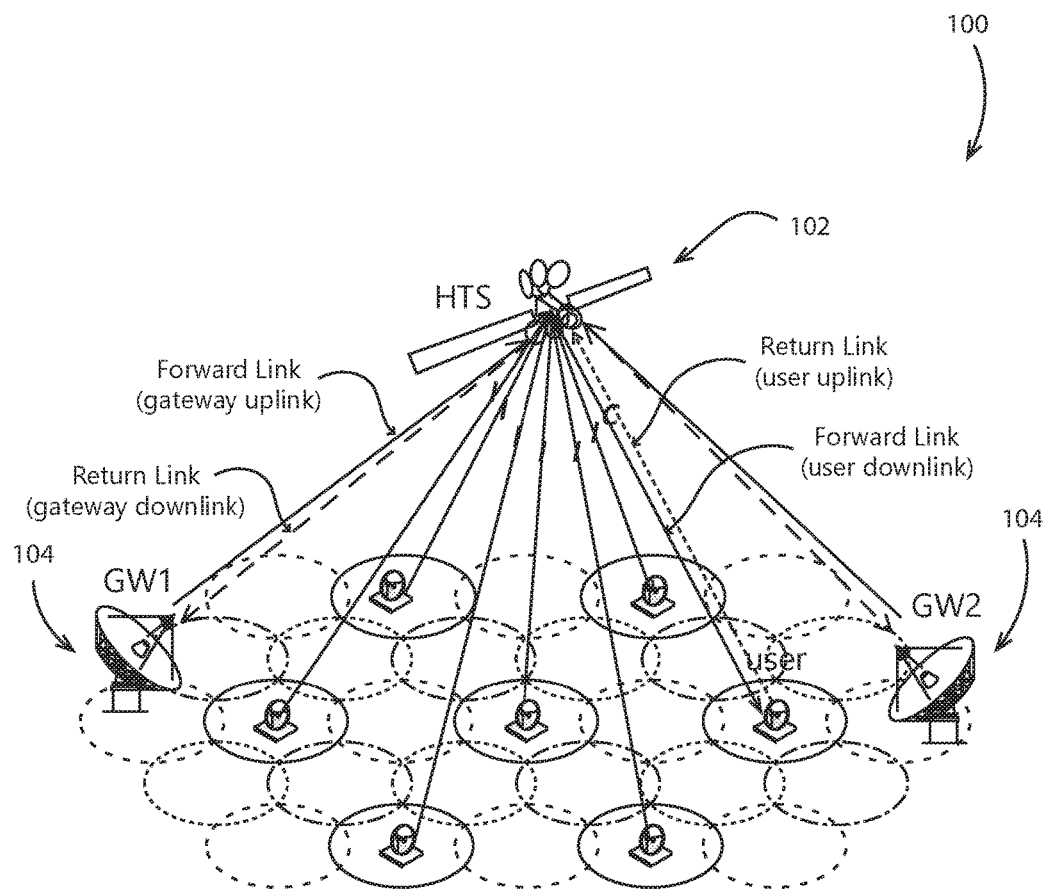
FIG. 1 shows, in block diagram form, one example of an HTS system.

In one aspect, the present application describes a high throughput satellite and a method of operating a high throughput satellite. The satellite has multiple modes of operation and transitions between them in response to the spectrum fill rate. Modes of operation may include altering color re-use patterns to increase or reduce number of colors, using intra-beam geographic sub-division, or precoding downlink signals.

In another aspect, the present application describes a method of operating a high throughput satellite having a plurality of downlink spot beams. The method includes causing the satellite to operate in a first operating mode that employs a first color re-use pattern for downlink transmissions; determining that a spectrum fill rate exceeds a first threshold; and based on the determination that the spectrum fill rate exceeds the first threshold, automatically causing the satellite to operate in a second operating mode that employs at least one of intra-beam geographic sub-division of one or more spot beams into an inner region and an outer region, wherein the inner region uses the first color re-use pattern and the outer region uses a second color re-use pattern having more colors than the first color re-use pattern, and precoding downlink signals onboard the satellite through application of a complex weighting vector to symbols in the downlink transmission for at least one of the spot beams.

In another aspect, the present application provides a high throughput satellite that includes a plurality of downlink spot beams and a digital processor. The digital processor is to operate the satellite in a first operating mode that employs a first color re-use pattern for downlink transmissions; determine that a spectrum fill rate exceeds a first threshold; and based on the determination that the spectrum fill rate exceeds the first threshold, automatically transition the satellite to a second operating mode that employs at least one of intra-beam geographic sub-division of one or more spot beams into an inner region and an outer region, wherein the inner region uses the first color re-use pattern and the outer region uses a second color re-use pattern having more colors than the first color re-use pattern, and precoding downlink signals onboard the satellite through application of a complex weighting vector to symbols in the downlink transmission for at least one of the spot beams.

In yet a further aspect, the present application describes a network operations center for controlling operation of a high throughput satellite in orbit, the satellite having a plurality of downlink spot beams and a plurality of operating modes. The network operations center includes a high speed telemetry and command link to the satellite; at least one processor; and memory storing processor-executable instructions that, when executed by the at least one processor, cause the processor to instruct the satellite to operate in a first operating mode that employs a first color re-use pattern for downlink transmissions, determine that a spectrum fill rate for the satellite exceeds a first threshold; and based on the determination that the spectrum fill rate exceeds the first threshold, automatically instruct the satellite to operate in a second operating mode that employs at least one of intra-beam geographic sub-division of one or more spot beams into an inner region and an outer region, wherein the inner region uses the first color re-use pattern and the outer region uses a second color re-use pattern having more colors than the first color re-use pattern, and precoding downlink signals onboard the satellite through application of a complex weighting vector to symbols in the downlink transmission for at least one of the spot beams.

Other example embodiments of the present disclosure will be apparent to those of ordinary skill in the art from a review of the following detailed description in conjunction with the drawings.

Any feature described in relation to one aspect or embodiment of the invention may also be used in respect of one or more other aspects/embodiments. These and other aspects of the present invention will be apparent from, and elucidated with reference to, the embodiments described herein.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Satellite Overview

Satellites are devices positioned in orbital space that are used for various purposes. In one example embodiment, the satellites are communication satellites. That is, they are positioned in orbital space for the purpose of providing communications. For example, communication satellites are designed to relay communication signals between two end-points (which may be stationary or mobile) to provide communication services such as telephone, television, radio and/or internet services.

The satellites may employ a variety of orbital paths around the Earth. For example, satellites may have geostationary orbits, molniya orbits, elliptical orbits, polar and non-polar Earth orbits, etc. Communication satellites typically have geostationary orbits. That is, the satellites have a circular orbit above the Earth's equator and follow the direction of the Earth's rotation. A satellite in such an orbit has an orbital period equal to the Earth's rotational period, and accordingly may appear at a fixed position in the sky for ground stations.

Communication satellites are typically spaced apart along the geostationary orbit. That is, the satellites are positioned in orbital slots. The satellite operators coordinate their use of orbital slots with each other under international treaty by the International Telecommunication Union (ITU), and the separation between slots depends on the coverage and frequency of operation of the satellites. For example, in at least some example embodiments, the separation between satellites may be between 2-3 degrees of orbital longitude. In at least some example embodiments, the separation between satellites may be less than 2 degrees of separation. The separation of satellites in such a manner allows for frequency reuse for both uplink and downlink transmission. For example, by separating adjacent satellites by a distance greater than the transmitting beamwidth (i.e., the angle, measured in a horizontal plane, between the directions at which the power of the beam is at least one-half its maximum value) of an antenna associated with the ground station for uplink transmission, the same frequency for the communication signals may be employed to uplink to adjacent satellites with interference at or below the coordinated level. Similarly, if the separated distance between the adjacent satellites is greater than the receiving beamwidth of the antenna associated with the ground station for downlink transmission, the same frequency for the communication signals may be employed to downlink from adjacent satellites with interference at or below the coordinated level.

In order to perform communication functions, the satellite is equipped with various components. For example, the satellite may include a communication payload (which may further include transponders, one or more antennas, and switching systems), engines (to bring the satellite to the desired orbit), tracking and stabilization systems (used to orient the satellite and to keep the satellite in the correct orbit), power subsystems (to power the satellite) and command and control subsystems (to maintain communication with ground control stations).

The transponder of the satellite forms a communication channel between two end-points to allow for communications between the two end-points. The transponder also defines the capacity of the satellite for communications.

The antenna of the satellite transmits and receives communication signals. More specifically, the antenna is an electronic component that converts electric currents (which may be generated by a transmitter) to propagating radio frequency (RF) signal during transmission, and converts induced RF signals to electric currents during reception. In at least some example embodiments, the antenna may be associated with an amplifier which may amplify the power of the transmitted or received RF signals.

The communication signals may be microwave signals. Microwave signals are RF signals that have wavelengths ranging from as long as one meter to as short as one millimeter. Equivalently, the frequency of the RF signals may range from 300 MHz to 300 Ghz. More particularly, the communication signals are within certain frequency bands of microwave signals as they are more suited for satellite communications. For example, in at least some example embodiments, a satellite may operate within the frequency of the C-band defined by the ITU. The C-band is a portion of the electromagnetic spectrum that ranges from approximately 4 GHz to 8 GHz. That is, the communication signals are transmitted by and received at the satellite within such a frequency range. In some cases, the satellite may operate within frequencies higher than 8 GHz. For example, the satellite may operate within the frequency of the Ku-band. The Ku-band is the portion of the electromagnetic spectrum that ranges from approximately 10 GHz to 18 GHz. In at least some example embodiments, the satellite may operate within other high frequencies above the Ku-band. For example, the satellite may operate within the Ka-band frequency. The Ka-band is the portion of the electromagnetic spectrum that ranges from approximately 26.5 GHz to 40 GHz (at present, the assigned slots for fixed satellite service (FSS) are 27-31 GHz for uplink and 17.7-21.2 GHz for downlink). In some examples, the satellite may be configured to operate in more than one band. In one example, the satellite may be equipped to receive and transmit signals within the C-band, Ku-band, and Ka-band. It will be appreciated that the satellites may operate within other microwave frequency bands. For example, the satellites may operate in any one of the defined microwave frequency bands ranging in frequencies from approximately 1 GHz to 170 GHz. Examples of other microwave frequency bands may include the X-band, Q-band, V-band, etc.

High Throughput Satellite Systems

In a conventional fixed-satellite service (FSS) system, one or several large beams (e.g. a semi-global beam for C-band and a few regional beams for Ku-band) are typically used to cover the desired areas, as described above.

In a high throughput satellite (HTS) system, a satellite uses multiple narrow spot beams (e.g. 0.6 deg Ka or Ku-band beams). These spot beams are arranged in a pattern to cover a desired area. An HTS system typically relies on "color re-use". Different portions of the spectrum used by different spot beams, or the same portion but using a different polarization, are referred to as different "colors". That is, each color represents a segment of spectrum with a bandwidth and polarization that can be accessed by the end users inside the coverage area of that spot beam. Using spatial separation, each color can be reused by multiple beams to increase the system capacity. In many implementations, the HTS system tries to minimize interference in both downlink and uplink signals by ensuring that adjacent beams use different colors. Typically, use of fewer colors will lead to higher inter-beam interference, especially at the edge of coverage (EOC), however, the overall throughput of the system may also become higher as more bandwidth is allocated to each coverage area. A conventional HTS network design may use a 4-color reuse scheme, but some systems may have 2-colors, 6-colors, 8-colors or more. It will be understood that a 2-color reuse pattern will result in some adjacent beams using the same color.

Reference is made to FIG. 1, which shows an example of an HTS system 100. The system 100 includes a satellite 102 equipped with a plurality of spot beams for transmitting and receiving. Each spot beam has a beam width that results in a coverage area at the surface of the Earth, as indicated by the individual circles. It will be appreciated that although the coverage areas are indicated as isolated circles the beam gain pattern extends beyond the indicated circle. The illustrated circle may indicate a −3 dB point, for example.

Color re-use is employed to minimize interference. If enough colors are used, then adjacent beams (i.e. adjacent coverage areas) do not use the same color, which assists in reducing inter-beam interference. The system 100, as illustrated, includes a plurality of gateways 104 that may be used for high-speed communications between one or more grounds stations and the satellite 102. For example, a ground station may include a network operations center (NOC) for configuring and managing the satellite 102.

In some implementations, the HTS system 100 may feature hundreds of spot beams. Spot beams are provided to support both the forward (gateway to satellite to user) and return (user to satellite to gateway) links. Through color re-use, many beams can use the same frequency and polarization and inter-beam interference is managed through spatial separation of the beam coverage areas. It will be appreciated that use of a large number of colors may result in limited bandwidth being allocated to each spot beam. This may negatively impact throughput. Color re-use patterns with fewer colors can improve the bandwidth available to each beam, but at a cost of higher inter-beam interference. Higher inter-beam interference adversely impacts the achievable throughput of the system and may also lower spectrum efficiency. Accordingly, conventional HTS systems are implemented with a fixed color re-use pattern that attempts to balance these factors. Typical HTS systems use a four color re-use pattern, as illustrated in FIG. 1, where the potential interfering "I" signals are shown relative to the carrier "C" signal, all of which use the same color.

One of the problems with selecting a fixed color re-use pattern is that the balance between spectrum demand and interference may change over time, e.g. over the operating life of satellite. A typical satellite initially has to service a low demand that gradually increases over time. In some cases, spectrum demand could also decline as services migrate to newer or alternative options. It would be advantageous to provide for methods and systems of operation that address changing demand and the shifting balance of concerns regarding interference and complexity of operation.

In accordance with one aspect of the present application, a satellite automatically alters its operation based on demand. The satellite may have two or more operating modes or phases and may automatically switch between those modes or phases based on a measurement of demand. One example of such a measurement is spectrum fill rate. Spectrum fill rate may be defined as the beam spectrum in use divided by the full bandwidth capability of the spot beam. The bandwidth capability of a spot beam may be set by the transponder design, e.g. any RF filters and/or high-power amplifiers (HPA) used in the transponder signal path.

In one aspect of the present application, a satellite may be configured with a first phase or mode operation in which it employs a certain color re-use pattern. Upon detection of the spectrum fill rate exceeding a set threshold, the satellite may automatically transition to a second phase or mode of operation to improve throughput by way of a satellite-based change in operation. The change in operation may either reduce interference or allocate more bandwidth to a beam. It will be appreciated that the determination of spectrum fill rate may be made at the satellite or may be made a ground-based network operations center (NOC) in communication with the satellite over a high-speed telemetry and command link (not illustrated). In many cases, a ground-based NOC may receive operating data and measurements from the satellite and may provide operations, settings, and control instructions to the satellite. Likewise, the determination to switch between modes of operation may be made at the satellite or at the ground-based NOC. In the description herein, such determinations may be described as occurring at the satellite or at the ground-based NOC, but it will be appreciated that the alternative is also a possible implementation.

In one example, the operational change in the second phase may be a change to a different re-use pattern having fewer colors. As demand increases from initially low levels to higher levels, it may be advantageous to allocate additional bandwidth to each beam, despite the consequent increase in potential inter-beam interference. This change may allow for the use of a higher number of colors in the initial color re-use pattern used in the first phase, so as to aim for minimal inter-beam interferences. By allowing for a transition to a color re-use pattern with fewer colours, the satellite can adapt to additional demand from an initially low demand for spectrum.

In another example, the second phase or mode of operation may involve applying intra-beam geographic sub-division. That is, the geographic coverage of each beam may be further divided into two or more regions, such as an inner region proximate the centre of the beam coverage and an outer region near the edge of coverage. The inner region may employ the color re-use pattern from the first phase, whereas the outer region may use a higher number color re-use pattern. In other words, the outer region is assigned channels in a slice of the beam spectrum (color) that will not be used by the outer region of the nearest beam using the same beam spectrum (color). Instead that outer region of the nearest beam will use a different slice of the beam spectrum. This is effectively use of a larger number of colors in a color re-use pattern for the outer regions. The demarcation of inner region and outer region may vary depending on the demand and the color re-use pattern.

In further example, the second phase or mode of operation may involve satellite based precoding of signals, to further optimize the user link performance and throughput.

In yet another example, the second phase may involve either intra-beam geographic sub-division, or precoding, or both. In some examples, the second phase, triggered by the spectrum fill rate exceeding a first threshold, involves intra-beam geographic sub-division, and a third phase, triggered by the spectrum fill rate exceeding a second higher threshold, involves precoding. In some cases, the intra-beam geographic sub-divisional, the precoding, or both may be applied to some spot beams but not all spot beams.

In some examples, the first phase incorporates changes in the color re-use pattern to reduce the number of colors over time as demand increases, as measured by spectrum fill rate, prior to transitioning to the second phase in which intra-beam geographic sub-division is employed. As spectrum fill rate hits a higher percentage, there may be a further transition to a third phase that adds precoding to at least some of the beams.

Figure 2:
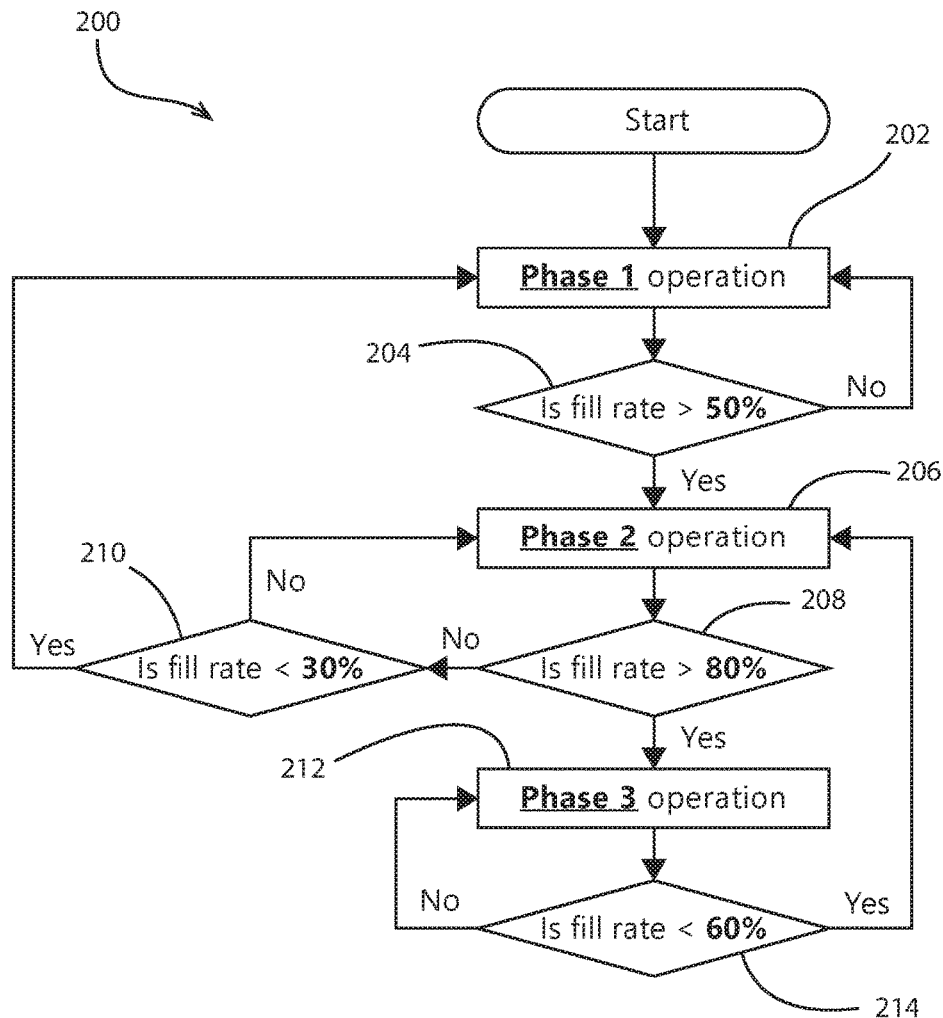
FIG. 2 shows, in flowchart form, an example method of operating a satellite.

FIG. 2 shows a flowchart illustrating one example method 200 of operating a satellite. The method 200 initiates with deployment of the satellite in orbit. The satellite first operates using a phase one mode of operation 202. In this example, the phase one mode of operation 202 involves a color re-use scheme to spatially separate spot beams that use the same slice of spectrum and polarization. Phase one mode of operation 202 may include changing from a greater color re-use pattern to a fewer color re-use pattern as demand (measured by spectrum fill rate) increases, or it may be a static color re-use pattern. For example, the phase one mode of operation 202 may start with an initial color re-use pattern and may, based on the spectrum fill rate exceeding an initial threshold, transition to a different color re-use pattern having fewer colors than the initial color re-use pattern.

While in the phase one mode of operation 202, the satellite monitors the spectrum fill rate to determine whether it meets or exceeds a first threshold 204. In this example, the first threshold is set at 50%, but it will be appreciated that the precise percentage is somewhat arbitrary. In one example, the assessment of spectrum fill rate may be more complex than the overall percentage used; for instance, it may take into account whether a certain number of beams have a fill rate that exceeds the threshold, as there may be certain geographic areas of higher demand than others, where the fill rate may be quite low and bring down the overall fill rate.

If the spectrum fill rate exceeds the first threshold 204, then the satellite transitions to a phase two mode of operation 206. In this example, the phase two mode of operation 206 involves using intra-beam geographic sub-division with at least some of the spot beams. The intra-beam geographic sub-division divides a beam into an inner region that has access to the full spectrum allocated to that beam by the color re-use pattern, and an outer region that has access to a portion of the spectrum allocated to that beam by the color re-use pattern. A nearest beam using the same color will allocate a different portion of the spectrum to its own outer region, such that the outer regions effectively adopt a higher color re-use pattern than is used for the inner regions.

While in the phase two mode of operation 206 the satellite continues to monitor the spectrum fill rate to determine whether it meets or exceeds a second threshold 208 that is higher than the first threshold 204. It also monitors whether, if the spectrum fill rate has not exceeded the second threshold 208, whether it has fallen below a third threshold 210 that is lower than the first threshold 204. If the spectrum fill rate falls below the third threshold 210, then the method 200 transitions the satellite back to the phase one mode of operation 202. If the spectrum fill rate exceeds the second threshold 208, then the satellite transitions to a phase three mode of operation 212.

In this example, the phase three mode of operation 212 involves applying precoding to the signals for at least some of the spot beams. As will be described in more detail in examples below, the precoding is determined and applied onboard the satellite payload, and can serve to improve spectrum usage efficiency, at the expense of greater computational complexity. When the spectrum fill rate has reach particularly high levels, it may be worth the extra computational complexity to use precoding to gain additional throughput and extend the useful life of the satellite.

Conversely, if the spectrum fill rate falls below a fourth threshold 214, it may no longer be worth the computational complexity of using precoding and the method 200 may transition back to the phase two mode of operation 206. The fourth threshold 216 may be set between the first threshold 204 and the second threshold 208.

In one example, the percentage spectrum fill rate values for the various thresholds 204, 208, 210, 214, may be set as follows:

| Threshold | Spectrum Fill Rate |
| --- | --- |
| First threshold 204 | 50% |
| Second threshold 208 | 80% |
| Third threshold 210 | 30% |
| Fourth threshold 214 | 60% |

It will be appreciated that the above values are merely examples and other values may be selected for other implementations.

In various embodiments, a satellite may feature two, three or more phases or modes of operation between which it switches based, at least in part, upon spectrum fill rate. The various phases or mode of operation may include use any of the three described techniques: changing color re-use pattern, intra-beam geographic sub-division, and precoding. Any particular phase may use a combination or sub-combination of the three described techniques, or additional techniques for increasing throughput or reducing inter-beam interference. Further illustrative examples of the three described techniques are provided below. Many of the examples focus on management of the user forward downlink portion of the satellite communication path, since that is the portion that is most likely to have the greatest tension between bandwidth demand (i.e. spectrum fill rate) and interference concerns.

Color Re-Use Pattern Changes

In one example, the color re-use pattern may initially be established with a relatively large number of colors, which minimizes inter-beam interference but allocates little bandwidth to each spot beam. Because of the low demand expected initially, the low bandwidth per spot beam may be acceptable in the early stages after deployment of the satellite. As demand increases, the color re-use pattern may be changed to reduce the number of colors.

In one example, the satellite may start with a 16-color re-use pattern on the user forward downlink. In a particular example, the spectrum being used for user forward downlink is the 19.7-20.2 GHz band. Each beam may be assigned 62.5 MHz of bandwidth and either an L or R orthogonal polarization. As demand increases, the pattern may be altered to be an 8-color re-use pattern, giving each beam 125 MHz of bandwidth. With further increases in demand, the pattern may again be altered to be a 4-color re-use pattern with 250 MHz per beam. A further transition to a 2-color re-use scheme may also be made, depending on transponder capabilities, thereby allocating a full (L or R polarized) 500 MHz of bandwidth to each beam.

Figure 3:
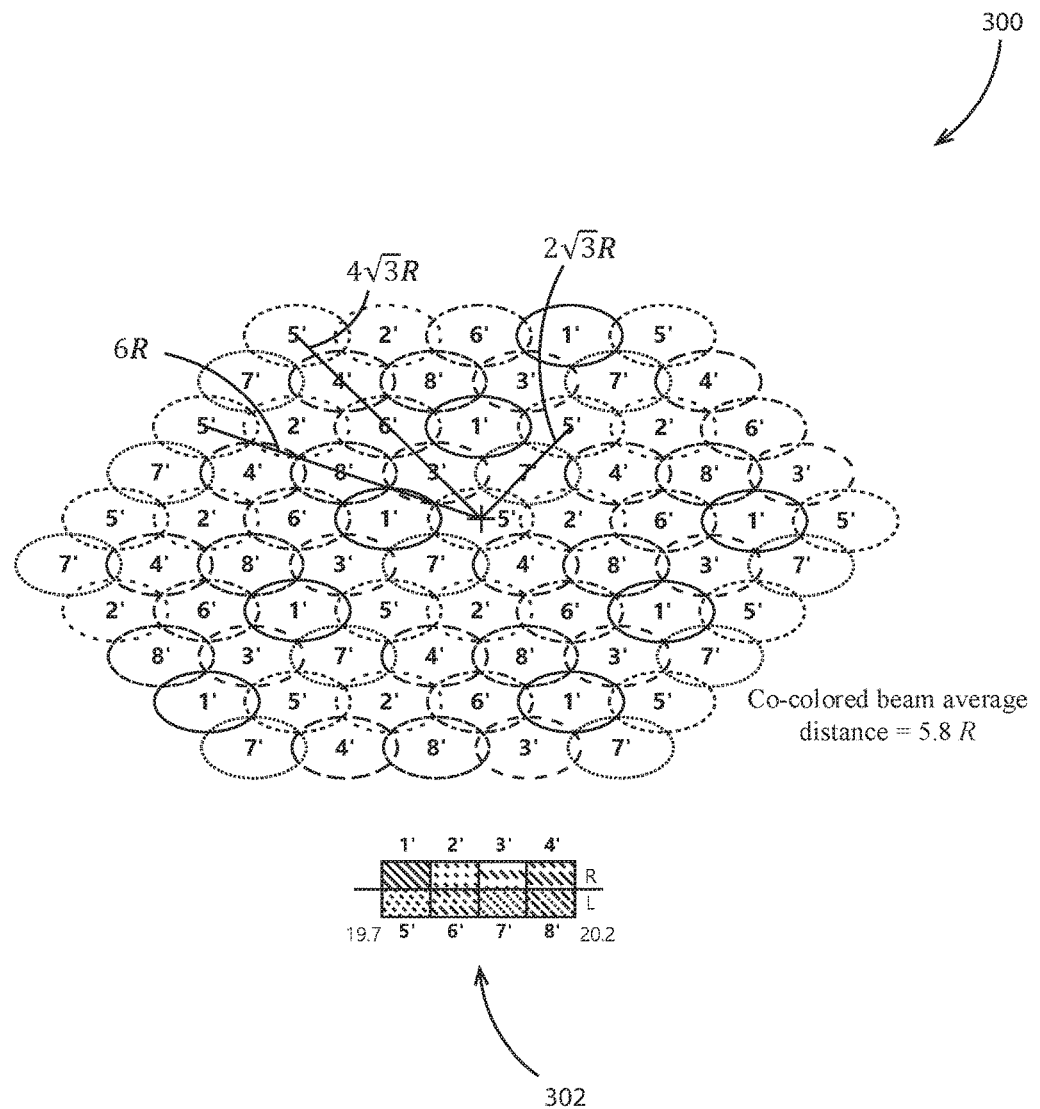
FIG. 3 shows an example of an 8-color re-use pattern.

An example 8-color re-use pattern 300 is shown in FIG. 3. The pattern 300 includes 70 spot beams having colors 1 through 8. The portions of the spectrum between 19.7 and 20.2 GHz allocated to each co-colored beam, and the assigned polarization, is graphically illustrated as shown by reference numeral 302.

Figure 4:
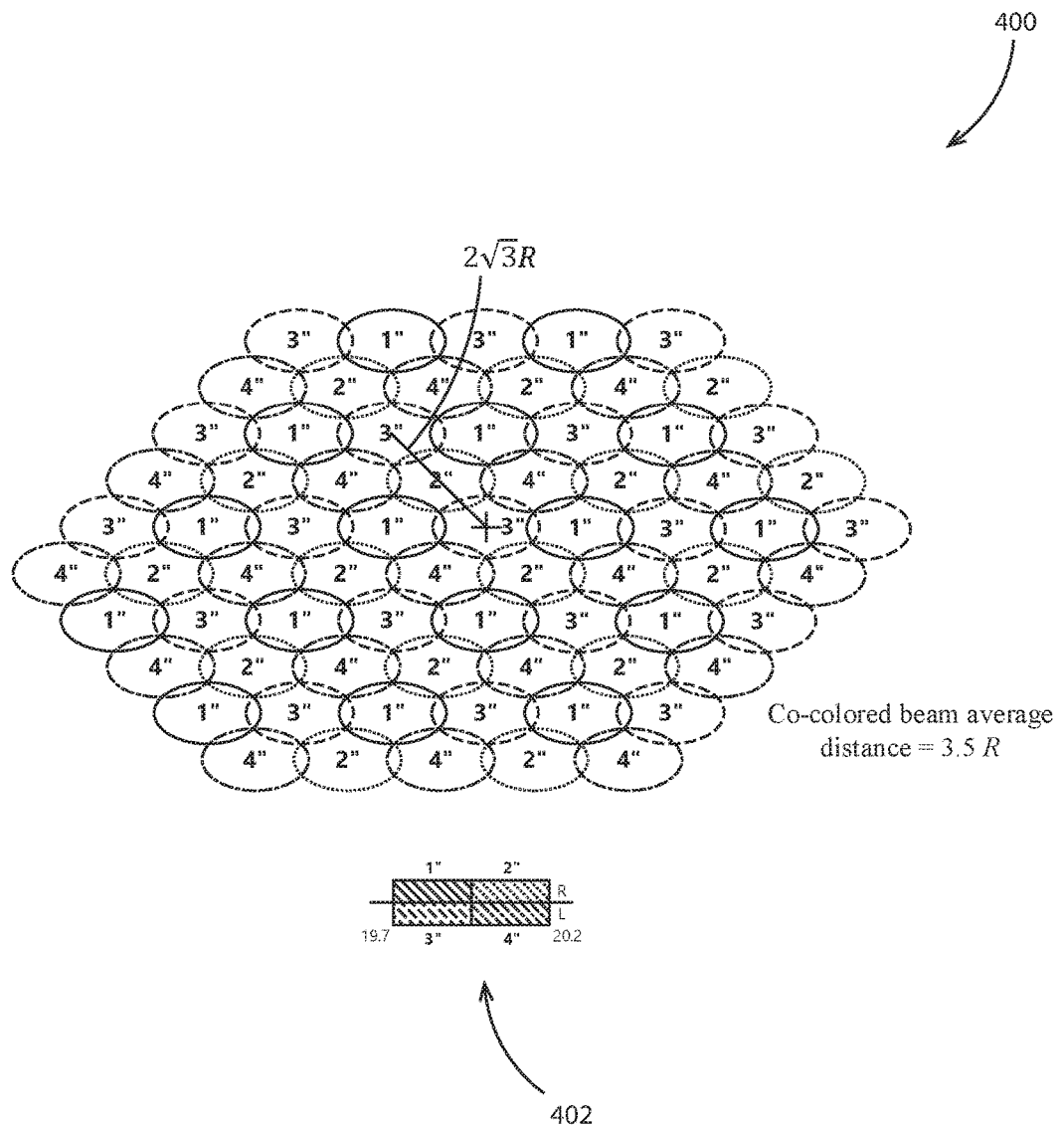
FIG. 4 shows an example of a 4-color re-use pattern.

Reference is now also made to FIG. 4, which shows the same beam layout with a 4-color re-use pattern 400. The allocation of spectrum among the four colors is indicated graphically 402.

In the 8-color re-use pattern 300, the average distance from the center beam to the first layer of the 8 co-colored neighbor beams is 5.8R, where R is the radius of the beam. In the 4-color re-use pattern 400, the average distance from the center beam to the first layer of the 6 co-colored neighboring beams is 3.5R. This closer spacing of co-colored beams implies a higher inter-beam interference.

Figure 5:
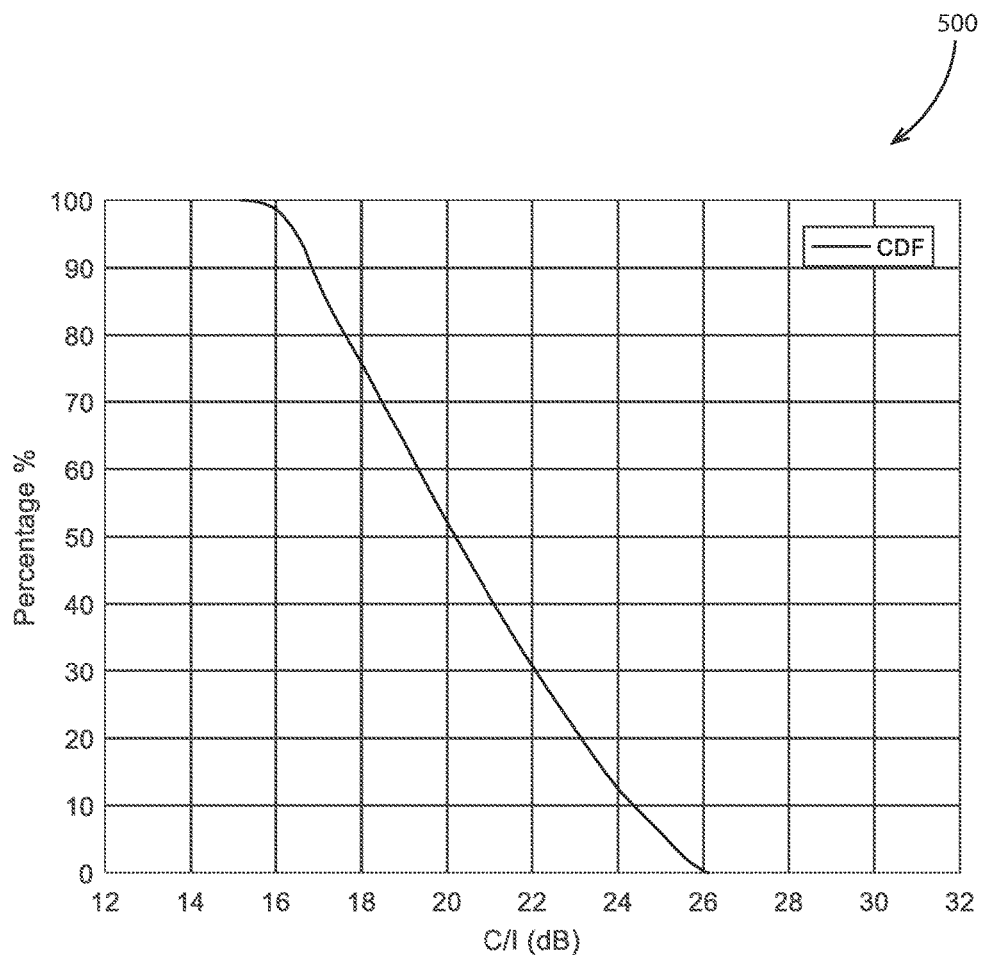
FIG. 5 shows a carrier-to-interference graph for an 8-color re-use pattern.
Figure 6:
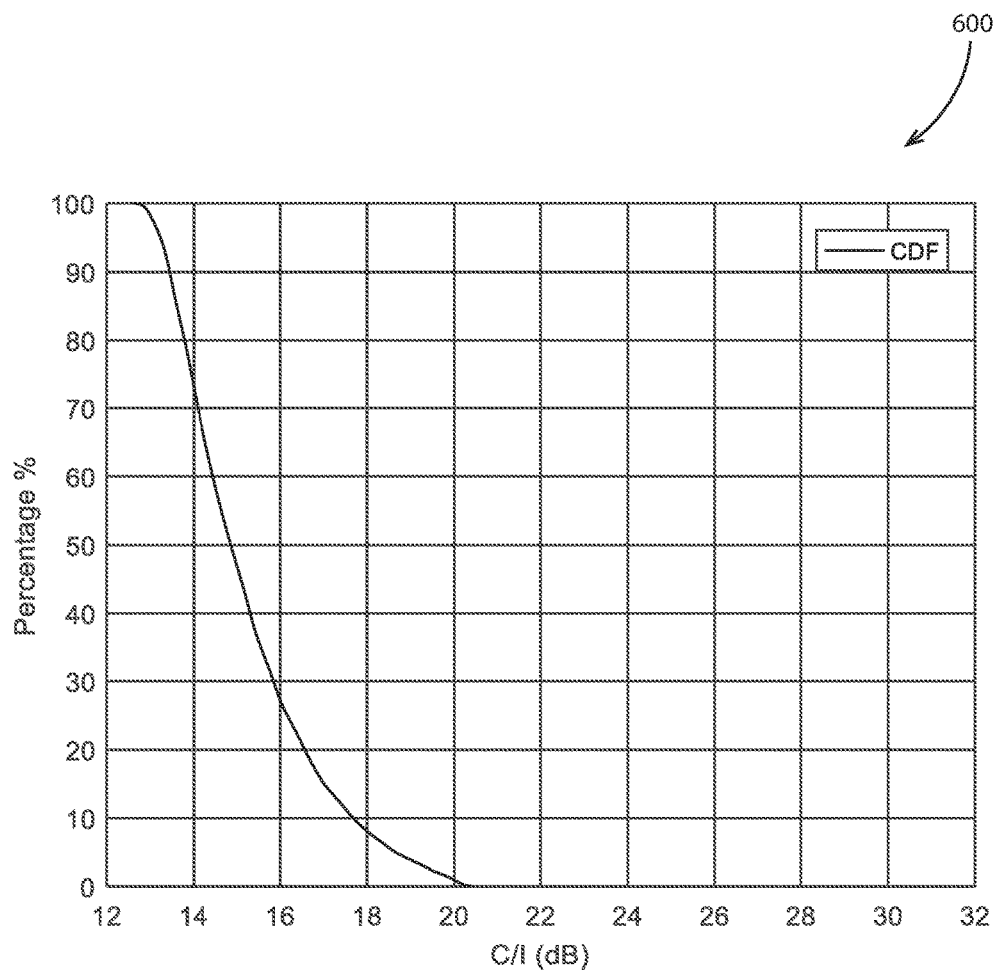
FIG. 6 shows a carrier-to-interference graph for a 4-color re-use pattern.

FIGS. 5 and 6 show carrier-to-interference graphs 500, 600 for the 8-color re-use pattern 300 and the 4-color re-use pattern, respectively. The average inter-beam carrier-to-interference (C/I) for the 4-color beam is 14.9 dB, which is about 5.3 dB down from the 8-color case. Detailed inter-beam C/I comparison for the 16, 8, and 4-color cases are shown in the following table:

TABLE 1

Color re-use pattern comparison

| | Spectrum fill rate | Peak C/I (dB) | Average C/I (dB) | EOC C/I (dB) |
|---|---|---|---|---|
| 16-color | 12.5% | 35.0 | 27.2 | 18.5 |
| 8-color | 25.0% | 26.1 | 20.2 | 15.2 |
| 4-color | 50.0% | 20.4 | 14.9 | 12.6 |
| 2-color | 100.0% | 11.0 | 6.4 | −0.43 |

Given the link carrier-to-noise ratio C/N=10 dB (less the inter-beam C/I), an SE improvement of 19.3% and 14.1% can be achieved for the fill rate 12.5% and 25% cases, respectively, when a higher color re-use pattern is used to improve inter-beam C/I. The SE comparison between the conventional fixed 4-color scheme and a graduated color re-use scheme that transitions from 16-color to 4-color based on fill rate is shown in the following table:

TABLE 2

Spectrum efficiency enhancement comparison

| Spectrum fill rate | Avg. SE, fixed 4-color (bps/Hz) | Avg. SE, graduated color re-use (bps/Hz) | Enhancement |
|---|---|---|---|
| 12.5% | 2.10 | 2.51 | 19.3% |
| 25.0% | 2.10 | 2.40 | 14.1% |
| 50.0% | 2.10 | 2.10 | 0 |

It has to be emphasized that the graduated color re-use pattern evolution of 16 to 8, 8 to 4, and 4 to 2 colors described above is only one example of color re-use pattern changes. The technique be generalized to any k*n-color to m*n-color spectrum evolution cases, where k and m are integers, m<k, and n is an even integer. For example, the color re-use patterns can also be transitioned from 12 to 6 colors (n=2, k=6, m=3), and then 6 to 4 colors (n=2, k=3, m=2), etc.

Intra-Beam Geographic Sub-Division

At different regions of the same beam, the satellite EIRP, G/T, and especially the inter-beam C/I, may be significantly different. Knowing this, a different allocation of available spectrum within regions of the beam coverage may be used to improve throughput.

Figure 7A:
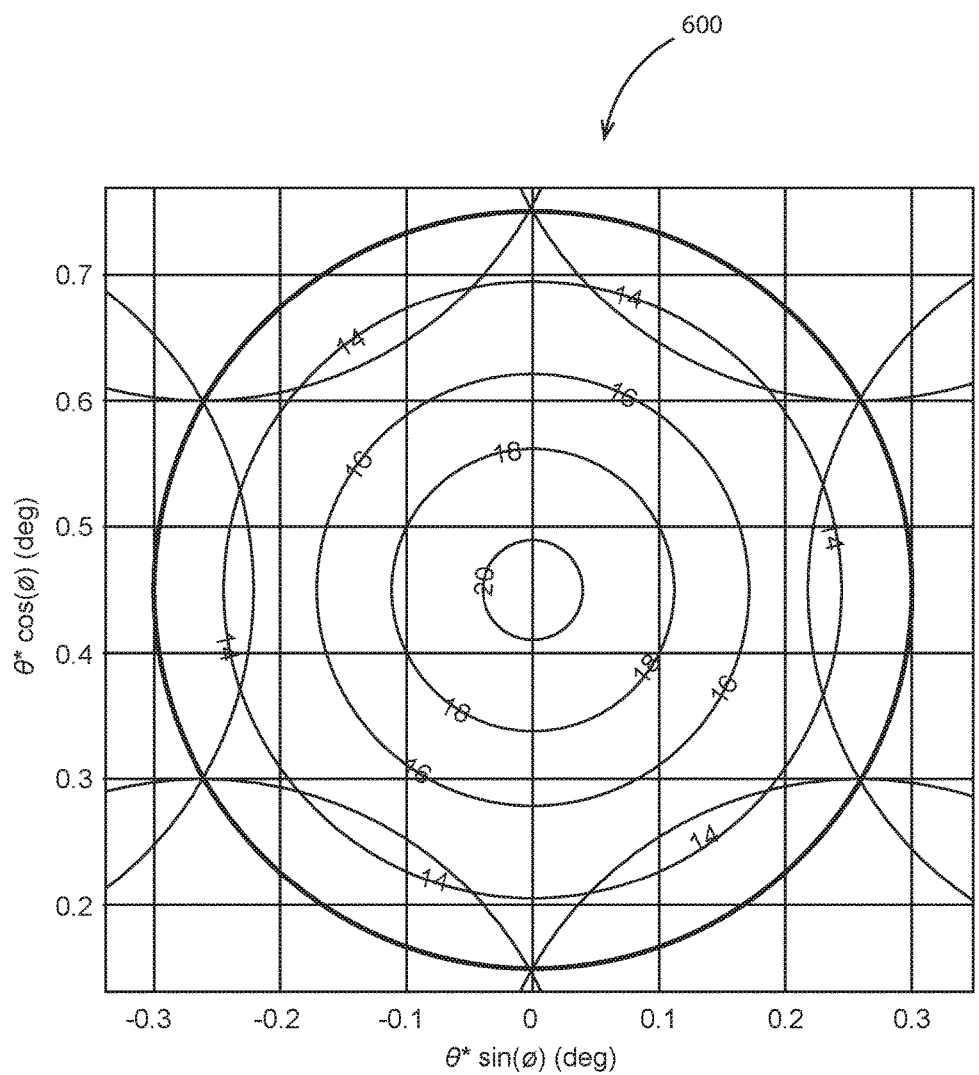
FIG. 7(a) shows one example of inter-beam C/I geographical distribution for a spot beam in a 4-color re-use pattern.
Figure 7B:
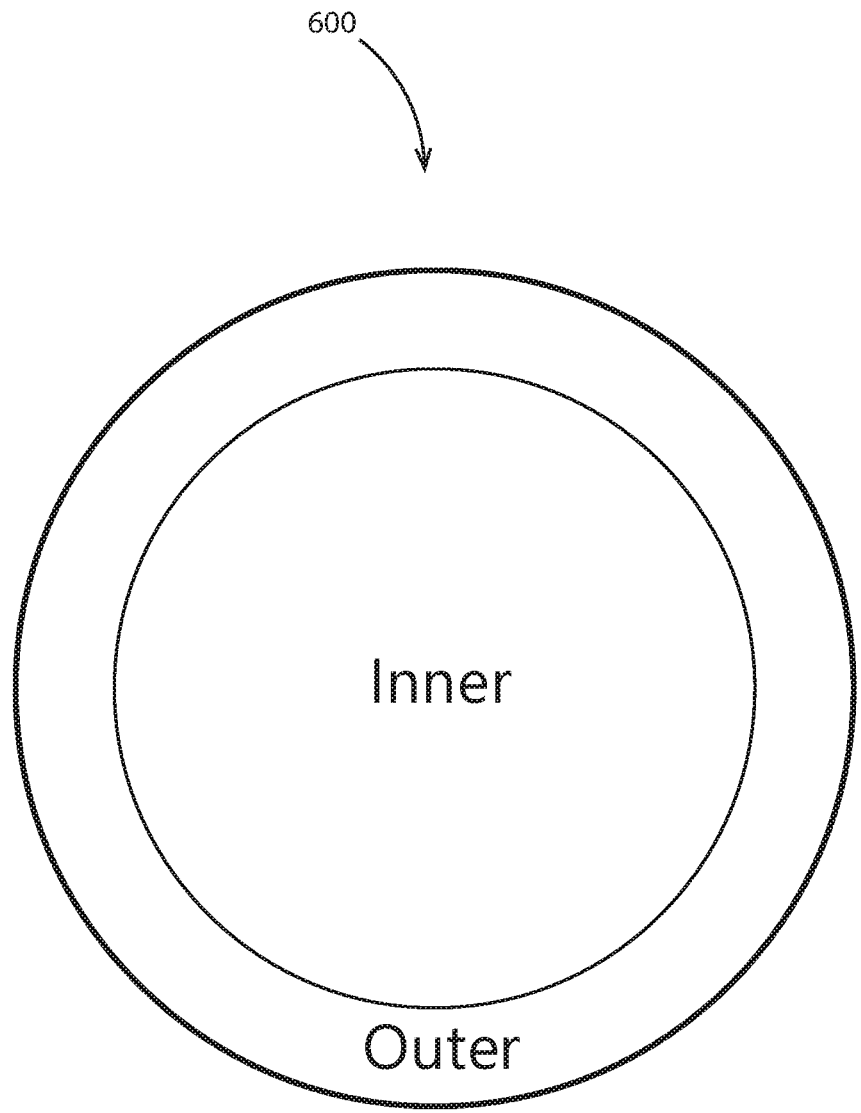
FIG. 7(b) illustrates the beam of FIG. 7(a) divided into an inner region and an outer region.

In at least some implementations, the geographic sub-division can be made based on the inter-beam C/I distribution. Taking a beam of a 4-color re-use pattern, for instance, the inter-beam C/I distribution may degrade based on radial distance from the beam center. FIG. 7(a) shows example C/I distribution 700 for such a beam. The concentric circles indicate C/I measurements at 20 dB, 18 dB, 16 dB, and 14 dB. In one example implementation, the divisional between inner region of the beam and outer region of the beam may be selected based on a particular C/I measurement or contour. For example, C/I=14 dB may be selected as the demarcation between inner and outer regions. The inner region uses the original 4-color re-use pattern, whereas the outer region uses an 8-color re-use pattern, so as to improve the C/I performance in that region. FIG. 7(b) illustrates the beam coverage area 702 divided into the inner region and outer region at the 14 dB contour.

Figure 8A:
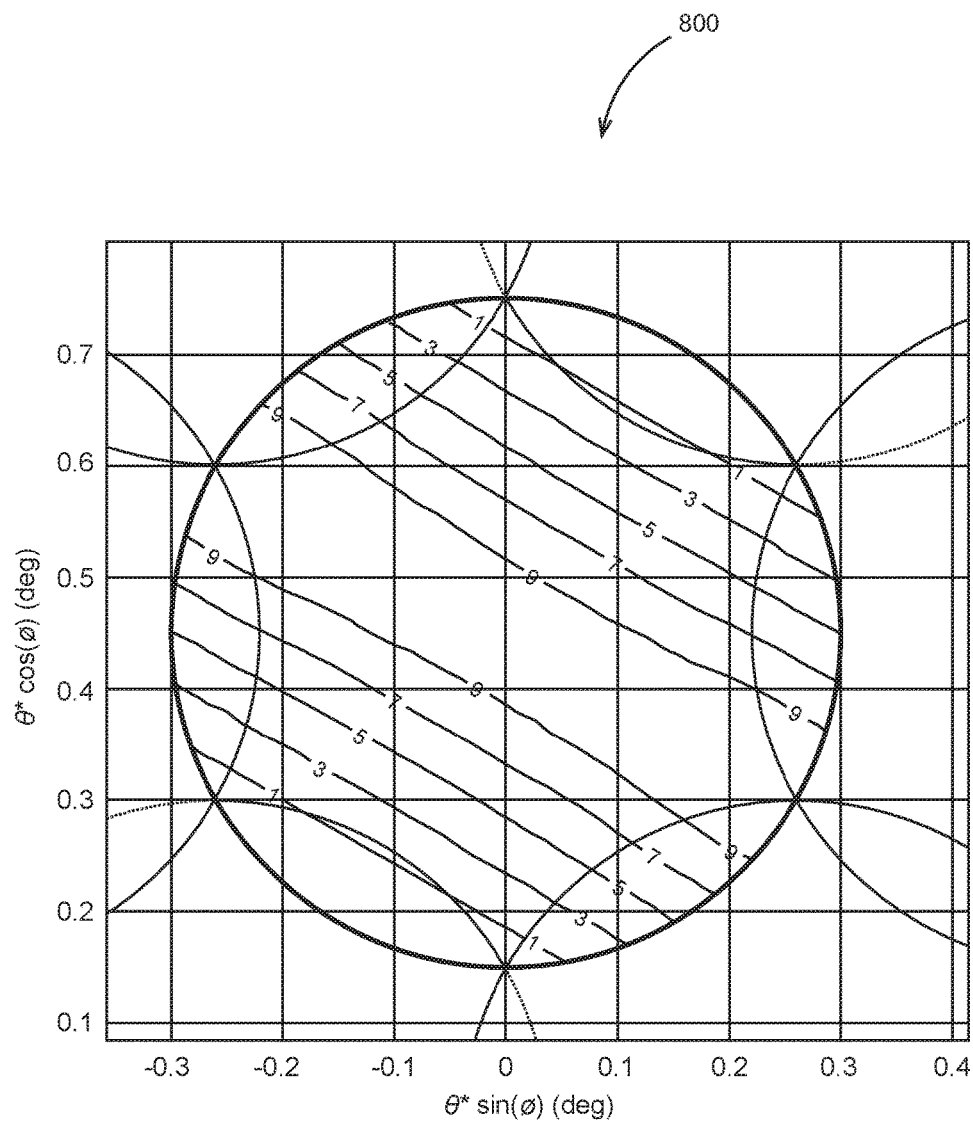
FIG. 8(a) shows one example of inter-beam C/I geographical distribution for a spot beam in a 2-color re-use pattern.
Figure 8B:
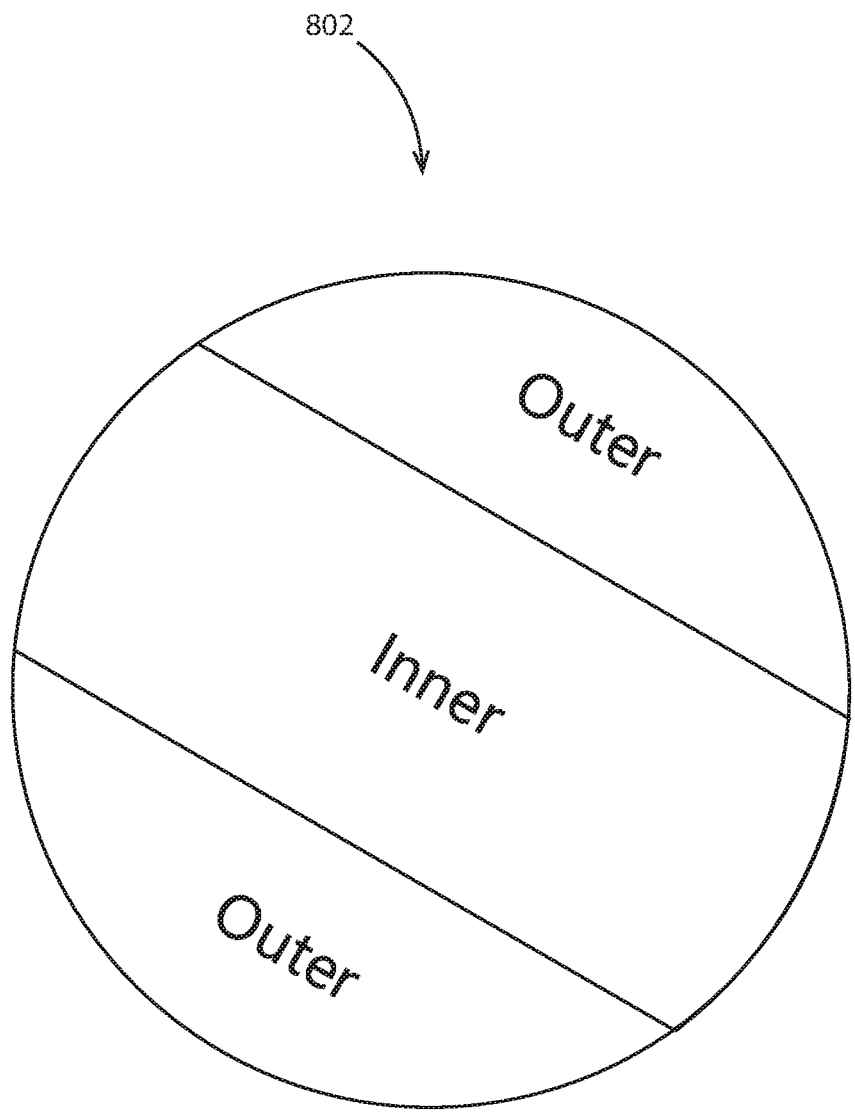
FIG. 8(b) shows the beam of FIG. 8(a) divided into inner and outer regions.

FIG. 8(a) shows another example C/I distribution 800, but for a 2-color re-use pattern. In this case, it will be noted that the contours of C/I measurements in this case tend to form parallel chords across the beam coverage area. Accordingly, the division of the coverage area into an inner region and outer region may take a form like that shown in FIG. 8(b), where a beam coverage area 802 is divided into an inner region and two outer regions based on the C/I=7 dB chords cutting across the beam coverage area.

The inter-beam C/I averages for the inner and outer regions of the beam coverage area can be compared as between the usual case and the example cases discussed above where the beam subject to geographic sub-division, as detailed in the following table:

TABLE 3 user beam C/I comparison re intra-beam geographic sub-division

| Case | Original Color Reuse | Original avg. C/I (dB) | Inner avg. C/I, After (dB) | Outer avg. C/I Before (dB) | Outer color Reuse, After | Outer avg. C/I, After (dB) |
|---|---|---|---|---|---|---|
| 1 | 4 | 14.8 | 16.2 | 13.9 | 8 | 18.1 |
| 2 | 2 | 6.4 | 9.0 | 2.9 | 4 | 13.9 |

Likewise, the SE enhancement may be quantified for these examples, where the link carrier-to-noise (C/N) is assumed to be 10 dB (less the inter-beam C/I), as shown in the following table:

TABLE 4 spectrum efficiency enhancement
re intra-beam geographic sub-division

| Case | Original Color Reuse | Overall SE, Before (bps/Hz) | Inner SE, After (bps/Hz) | Outer SE, Before (bps/Hz) | Outer SE, After (bps/Hz) | Enhancement for Outer |
|---|---|---|---|---|---|---|
| 1 | 4 | 2.10 | 2.21 | 2.05 | 2.32 | 12.8% |
| 2 | 2 | 1.44 | 1.65 | 1.03 | 2.05 | 100.3% |

It will be appreciated that the geographic demarcation line between the inner and outer regions of a beam may alternatively be chosen based on any geometric shape instead of following the original C/I contour line as in the above description. For example, the inner region can be a concentric square with an area ratio of 50% to the original beam coverage. The shape and area ratio between the inner and outer regions can also be different for different beams.

Satellite-Based Precoding

When the spectrum available to each beam is close to fully occupied and the inter-beam interference becomes dominant, especially in the forward links, it may be difficult to squeeze further performance out of the satellite once the above-described techniques have been implemented. Onboard precoding may be used to mitigate interference concerns and maximize overall throughput of the HTS system. Precoding was originally introduced for a ground-based cellular communication with multiple-input multiple-output (MIMO) architecture. However, in this aspect of the present application, the precoding is implemented onboard the satellite payload.

In a multi-spot beam HTS system with frequency reuse, the forward signal y received at each user terminal in terms of the satellite transmitted data symbol s, the channel gain h and the associated thermal noise σ can be written in the vector format as:

$$Y = Hs + \sigma \cdot \#. \quad \#(1)$$

For a given user beam i, equation (1) can be expanded to a matrix form as:

$$\begin{bmatrix} y_{i,1} \\ y_{i,2} \\ \vdots \\ y_{i,n_i} \end{bmatrix} = \begin{bmatrix} h_{1,1} & h_{1,2} & \cdots & h_{1,N} \\ h_{2,1} & h_{2,2} & \cdots & h_{2,N} \\ \vdots & \vdots & \ddots & \vdots \\ h_{n_i,1} & h_{n_i,2} & \cdots & h_{n_i,N} \end{bmatrix} \begin{bmatrix} s_1 \\ s_2 \\ \vdots \\ s_N \end{bmatrix} + \sigma, \quad \#(2)$$

where there are a total of $n_i$ terminals in beam i and an overall of N terminals in the whole HTS network. The parameters $y_{i,1}, y_{i,2}, \ldots, y_{i,ni}$ are the received signals at terminal 1, 2, ... $n_i$, respectively, inside beam i; $s_1, s_2, \ldots s_N$ are the signal symbols sent from the satellite payload to the N respective terminals on the ground; $h_{j,k}$ (j=1 to $n_i$ and k=1 to N) is the gain of the communication channel originated from the k-th symbol on the payload to the j-th terminal on the ground. Due to limited antenna isolation between the spot beams, each terminal will also receive the signals intended for other beams (or even other terminals inside the same beam, if CDMA type of carriers are used), which become inter-beam interference to the desired signal. This has been reflected by the non-zero off-diagonal elements of the channel matrix H in equation (1) and (4) below.

If there are M user beams, the total number of user terminals in the network are:

$$N = \sum_{i=1}^{M} n_i. \quad \#(3)$$

Putting all N received signal equations together, we can have a generic matrix expression for the multi-terminal HTS system:

$$\begin{bmatrix} y_1 \\ y_2 \\ \vdots \\ y_j \\ \vdots \\ y_N \end{bmatrix} = \begin{bmatrix} h_{1,1} & h_{1,2} & \cdots & h_{1,j} & \cdots & h_{1,N} \\ h_{2,1} & h_{2,2} & \cdots & h_{2,j} & \cdots & h_{2,N} \\ \vdots & \vdots & \ddots & \vdots & \cdots & \vdots \\ h_{j,1} & h_{j,2} & \cdots & h_{j,j} & \cdots & h_{j,N} \\ \vdots & \vdots & \vdots & \vdots & \ddots & \vdots \\ h_{N,1} & h_{N,2} & \cdots & h_{N,j} & \cdots & h_{N,N} \end{bmatrix} \begin{bmatrix} s_1 \\ s_2 \\ \vdots \\ s_j \\ \vdots \\ s_N \end{bmatrix} + \sigma. \quad \#(4)$$

The matrix element $h_{j,k}$ (j, k=1 to N) in equation (4) can be decomposed into $$h_{j,k} = a_{j,i} \cdot G_{i,k} \cdot L_k \cdot F_k \cdot R_k, \quad \#(5)$$

where $a_{j,i}$ is the payload path gain from the source of j-th symbol in the onboard satellite digital processor (DP) to the i-th downlink beam antenna input. $G_{i,k}$ is the i-th beam antenna gain towards the terminal k on the ground; $L_k$ and $F_k$ are the free space loss and fade loss between the satellite and the terminal k, respectively; $R_k$ is the receiving antenna gain of the user terminal k towards the HTS. In the above parameters, $a_{j,i}$, $G_{i,k}$, $L_k$ and $R_k$ are the deterministic physical terms which can be well characterized in advance, while $F_k$ can be fluctuating due to the environment conditions, e.g. the ionosphere and atmosphere, would need to be monitored at the user terminal side.

A precoding module in the satellite may apply a complex weighting vector w to the signal symbol s before sending it to the downlink antenna. The value of w may be chosen so as to try to maximize the overall throughput of the system. In term of the expression in equation (1), the weighting vector w for precoding is incorporated as:

$$Y = H(Ws) + \sigma, \quad \#(6)$$

which can be expressed in matrix form as:

$$\begin{bmatrix} y_1 \\ y_2 \\ \vdots \\ y_j \\ \vdots \\ y_N \end{bmatrix} = \quad \#(7)$$

$$\begin{bmatrix} h_{1,1} & h_{1,2} & \cdots & h_{1,j} & \cdots & h_{1,N} \\ h_{2,1} & h_{2,2} & \cdots & h_{2,j} & \cdots & h_{2,N} \\ \vdots & \vdots & \ddots & \vdots & \cdots & \vdots \\ h_{j,1} & h_{j,2} & \cdots & h_{j,j} & \cdots & h_{j,N} \\ \vdots & \vdots & \vdots & \vdots & \ddots & \vdots \\ h_{N,1} & h_{N,2} & \cdots & h_{N,j} & \cdots & h_{N,N} \end{bmatrix} \begin{bmatrix} w_1 & 0 & \cdots & 0 & \cdots & 0 \\ 0 & w_2 & \cdots & 0 & \cdots & 0 \\ \vdots & \vdots & \ddots & \vdots & \cdots & \vdots \\ 0 & 0 & \cdots & w_j & \cdots & 0 \\ \vdots & \vdots & \vdots & \vdots & \ddots & \vdots \\ 0 & 0 & \cdots & 0 & \cdots & w_N \end{bmatrix}$$

$$\begin{bmatrix} s_1 \\ s_2 \\ \vdots \\ s_j \\ \vdots \\ s_N \end{bmatrix} + \sigma.$$

At terminal j, the received signal $y_j$ and the corresponding signal-to-interference-plus-noise ratio $SNIR_j$ are:

$$y_j = \sum_{k=1}^{N} h_{j,k} w_k s_k + \sigma, \quad \#(8)$$

$$SINR_j = \frac{C_j}{(I+N)_j} = \frac{|h_{j,j} w_j|^2}{\sum_{k \neq j}^{N} |h_{j,k} w_k|^2 + \sigma^2}. \quad \#(9)$$

Accordingly, the complex-weighting vector w is chosen by solving the following optimization problem:

$$\underset{\Sigma \|w\|^2 < P}{\text{maximize}} \sum_{j=1}^{N} c_j \log_2(1 + SINR_j), \quad \#(10)$$

where the summation is the weighted total achievable information throughput of the system estimated by Shannon limit, $c_j$ is an (optional) predefined weighting factor representing the user terminal priority. If all terminals are in equal priority, $c_j=1$ (j=1 to N) may be used. The power of w, i.e. $\|w\|^2$ must be constrained by a certain value P that can be supported by the satellite onboard DP.

To solve equation (10) for w, the channel matrix H is defined and occasionally updated due to the time-varying fade loss it contains. The N individual intended channel gains $h_{k,k}$ (k=1 to N) are measured at the user terminal side and sent back to the DP via a single-hop user to satellite return link. With the intended channel fading loss $F_k$ known from $h_{k,k}$, all general channel elements, i.e. $h_{j,k}$ in equation (7-9) can be updated by equation (5). If the terminal k is moving, then the $G_{j,k}$, $L_k$ and $R_k$ in (5) must also be updated in order to solve (10).

The vector w calculation and updating process impacts the effectiveness of the precoding as it would ideally reflect the close-to-real-time environment of the user links. Accordingly, in some implementations, the calculation for w is performed by the onboard processor at the satellite based on near-constant reports from the user terminals regarding the channel gain measurements at the user terminals. Because the precoding module is located onboard the satellite, the H matrix update can be made much faster and, thus, more effectively, than if those calculations for precoding were performed at on the ground gateways. Many existing precoding algorithms, such as Zero Forcing (ZF), Minimum Mean Square Error (MMSE), can be readily used to solve (10). In practical implementations, the satellite may impose a minimum time period or a threshold for the H matrix accumulated changes before starting the next weighting vector w's calculation so as to reduce the computational loading of the DP.

It will be appreciated that precoding for all user terminals may consume a significant portion of the satellite DP resource. Accordingly, in some implementations, the satellite may only precode for user terminals in the outer region of the beams as defined in the phase two mode of operation, e.g. using intra-beam geographic sub-division. When implementing the onboard precoding, the user terminals that share the same spectrum (color) are all included in the evaluation, otherwise equation (9) will not include all interferences, and the consequent precoding will be sub-optimal. Due to the random nature of the thermal and other noises, precoding is not likely to improve the C/N of the link, but may help the inter-beam C/I. Theoretically the inter-beam C/I can be completely cancelled out, but in practical realization, a 3 to 9 dB improvement on the overall C/I may be achievable with the proposed onboard precoding.

Figure 9:
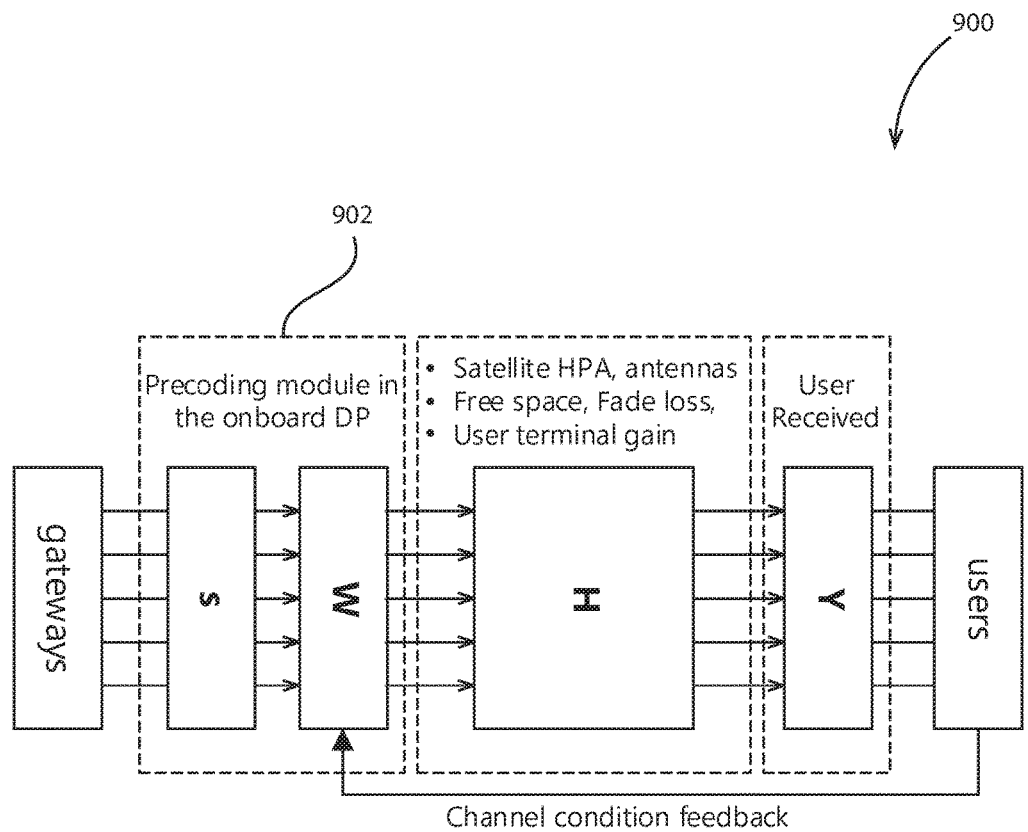
FIG. 9 diagrammatically illustrates the channel gain/loss and precoding feedback loop for an HTS system.

FIG. 9 shows a simplified block diagram of an example HTS system 900 illustrating the sources of gain/loss. In this example, a precoding module 902 in the onboard digital processor receives the signal symbols s from the gateway(s), and applies the complex weighting vector w. The channel gain/loss conditions are represented by matrix H, including amplification, the antenna gain, free space loss, fade loss, and the user terminal gain. The signals Y received by the user terminals are used to determine the respective channel gain at each user terminal, each of which is then reported back to the digital processor by way of an uplink channel, where those measured gains are used to update the complex weighting vector w.

Figure 10:
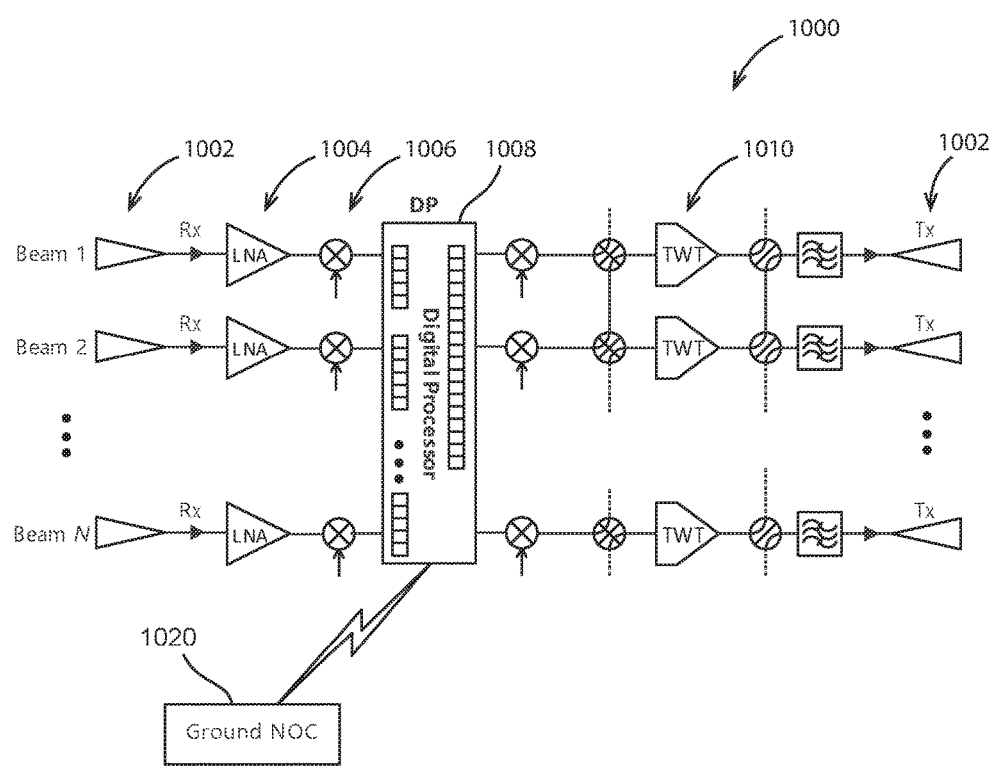
FIG. 10 shows, in block diagram form, one example of an HTS payload.

FIG. 10 shows, in block diagram form, one example of an HTS payload 1000. The HTS payload 1000 in this example includes N spot beam antennas 1002. Signals received in one of the spot beam antennas 1002 are amplified by low noise amplifiers (LNA) 1004, down-converted in mixers 1006, and input to a digital processor (DP) 1008. The DP 1008 digitizes the down-converted spectrum to produce digitized spectrum to enable fast analysis and switching operations, including channel switching or reassignment. The digital processor 1008 may also implement one or more of the methods described herein for operating the HTS satellite. For example, the digital processor 1008 may, through control signals, alter the spectrum and polarization assigned to individual spot beams. As another example, the digital processor 1008 may use channel switching to ensure channels directed to particular user terminals in a spot beam are allocated based on an intra-beam geographic sub-division model. As yet another example, the digital processor 1008 may implement precoding of signals received, including the determination of a suitable complex weighting vector w.

The digitized channels, are output by the DP 1008 for up-conversion, amplification (typically via traveling wave tube 1010), and transmission via the antennas 1002.

The HTS payload 1000 may communicate with a ground network operations center (NOC) 1020 by way of a high-speed telemetry and command link for communicating metadata and connection parameters to the ground NOC 1020, and for receiving configuration and settings instructions from the NOC 1020. The NOC 1020 may include one or more servers and software for implementing a network management function to manage the configuration and traffic flow of the HTS payload 1000. The NOC 1020 may implement a portion or all of the operations of one or more of the methods described herein. For example, the NOC 1020 may determine the division between inner and outer regions in a phase two operating mode, and may instruct remote terminals in the outer regions regarding frequencies available for reception and or transmission due to the altered color re-use pattern plan of frequencies in that region. The NOC 1020 may make the determination of whether to transition from one mode of operation to another based, at least in part, on spectrum fill rate data, and may instruct the HTS payload 1000 regarding changes in operating mode.

The NOC 1020 may further implement a user billing operations and support system to approve access and registration of remote sites to utilize the HTS, and to sending set-up and configuration information to the HTS and/or remote terminals. For example, it may instruct remote terminals as to which frequencies they are to use and the available bandwidth, etc. The HTS may also relay information from the remote terminal to the NOC 1020, such as user location information (obtained through GPS in the remote terminals in some cases).

It will be appreciated that the NOC 1020 operations may be implemented using one or more processors executing machine-readable instructions for causing the one or more processors to carry out the described operations.

Detailed Example Embodiment

In one illustrative example embodiment, an HTS system implements the above-described three-phase modes-of-operation transitional process. In this example, the HTS system include 100 0.6° spot beams. The accessible user forward (downlink) spectrum is 500 MHz, including 5% carrier roll-off and 5% guard bands. Each HTS transponder high-power amplifier supports two user beams, with a rated power of 190 W. All user terminals are presumed to use a 0.75 m antenna. The analysis below compares conventional fixed 2-color reuse with the above-described three-phase process, over an expected 16 year life of operation.

Figure 11:
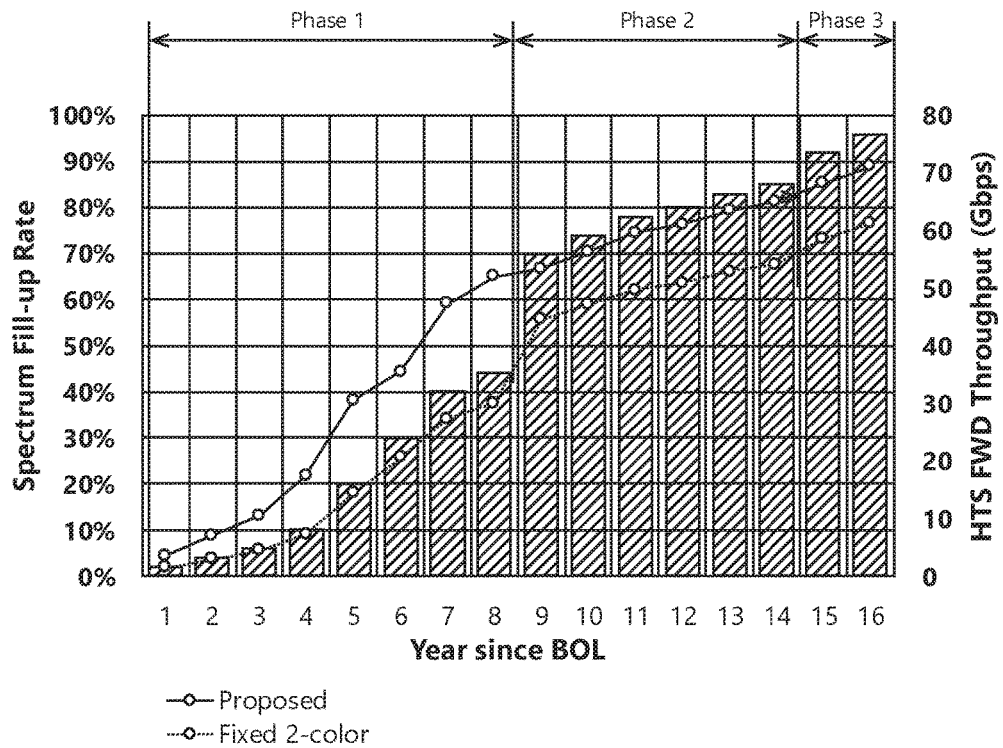
FIG. 11 shows fill rates and corresponding throughput comparisons for an HTS system using an example three-phase operation.

FIG. 11 shows fill rates and corresponding throughput comparisons. From year 1 to 8, the proposed HTS system using three-phase operation operates in phase one, and uses evolving spectrum sub-division until the fill rate reaches 44%. From year 9 to 14, the proposed HTS system uses the intra-beam geographic sub-division of phase two mode of operation, where the inner region of the beam uses a 2-color re-use pattern and the outer region uses a 4-color re-use pattern. The beams are divided into inner and outer regions with a 1:1 area ratio and a division as shown in FIG. 8(*b*). In years 15 and 16, the HTS system uses phase three mode of operation. In this phase, the outer regions adopt 2-color re-use, like the inner regions. The inter-beam C/I of the outer region may drop to 3 dB or worse under these circumstances; however satellite onboard precoding may enhance capacity by up to 60%, assuming at least a 6 dB improvement in the inter-beam interference.

Performance of the conventional fixed 2-color re-use scheme and the proposed HTS multi-phase operation can be compared using the following tables. The first table details performance of the HTS using conventional 2-color re-use pattern, and the second table details performance of the HTS using the proposed three-phase modes of operation described above.

TABLE 5

Conventional 2-color HTS: throughput and other parameters.

| | Year | | | | | | | |
|---|---|---|---|---|---|---|---|---|
| | 1 | 2 | 5 | 8 | 9 | 13 | 15 | 16 |
| Spectrum fill rate | 2% | 4% | 20% | 44% | 70% | 83% | 92% | 96% |
| BW, assigned (MHz) | 10 | 20 | 100 | 220 | 350 | 415 | 460 | 480 |
| Color Reuse | 2 | 2 | 2 | 2 | 2 | 2 | 2 | 2 |
| Avg. C/I (dB) | 6.4 | 6.4 | 6.4 | 6.4 | 6.4 | 6.4 | 6.4 | 6.4 |
| SE (bps/Hz) | 1.53 | 1.53 | 1.50 | 1.44 | 1.34 | 1.34 | 1.34 | 1.34 |
| Total FWD (Gbps) | 1.5 | 2.9 | 14.3 | 30.1 | 44.6 | 52.8 | 58.6 | 61.1 |

TABLE 6

Proposed 3-phase HTS operation: throughput and other parameters

| | Year | | | | | | | |
|---|---|---|---|---|---|---|---|---|
| | 1 | 2 | 5 | 8 | 9 | 13 | 15 | 16 |
| Operation phase | 1 | 1 | 1 | 1 | 2 | 2 | 3 | 3 |
| Spectrum fill rate | 2% | 4% | 20% | 44% | 70% | 83% | 92% | 96% |
| All/inner BW, assigned (MHz) | 10 | 20 | 100 | 220 | 300 | 350 | 380 | 400 |
| All/inner # of color reuse | 16 | 16 | 8 | 4 | 2 | 2 | 2 | 2 |
| All/Inner C/I (dB) | 27.2 | 27.2 | 20.2 | 14.9 | 9.0 | 9.0 | 9.0 | 9.0 |
| All/inner SE (bps/Hz) | 3.66 | 3.66 | 3.21 | 2.49 | 1.57 | 1.57 | 1.57 | 1.57 |
| Outer BW, assigned (MHz) | | | | | 50 | 65 | 80 | 80 |
| Outer # of color reuse | | | | | 4 | 4 | 2 | 2 |
| Outer C/I (dB) | | | | | 13.9 | 13.9 | 8.9 | 8.9 |
| Outer SE (bps/Hz) | 1.82 | 1.82 | 1.49 | 1.49 | | | | |
| Total FWD (Gbps) | 3.5 | 7.0 | 30.5 | 52.0 | 53.4 | 63.5 | 68.0 | 71.0 |
| Enhancement | 139% | 139% | 114% | 73% | 20% | 20% | 16% | 16% |

The measurements of outer C/I in years 15 and 16, both 8.9 dB, include the 6 dB gain due to precoding. It will be appreciated that the proposed techniques enable a significant improvement in spectrum efficiency and may extend the useful life of an HTS system.

The various embodiments presented above are merely examples and are in no way meant to limit the scope of this application. Variations of the innovations described herein will be apparent to persons of ordinary skill in the art, such variations being within the intended scope of the present application. Additionally, the subject matter described herein and in the recited claims intends to cover and embrace all suitable changes in technology.

The invention claimed is:

1. A method of operating a high throughput satellite having a plurality of downlink spot beams, the method comprising:
   causing the satellite to operate in a first operating mode that employs a first color re-use pattern for downlink transmissions;
   determining that a spectrum fill rate exceeds a first threshold; and
   based on the determination that the spectrum fill rate exceeds the first threshold, automatically causing the satellite to operate in a second operating mode that employs at least one of
   intra-beam geographic sub-division of one or more spot beams into an inner region and an outer region, wherein the inner region uses the first color re-use pattern and the outer region uses a second color re-use pattern having more colors than the first color re-use pattern, and
   precoding downlink signals onboard the satellite through application of a complex weighting vector to symbols in the downlink transmission for at least one of the spot beams.

2. The method of claim 1, wherein the first mode of operation includes initiating operation of the satellite using an initial color re-use pattern, determining that the spectrum fill rate exceeds an initial threshold, and, based on that determination, changing the operation of the satellite to use the first color re-use pattern, wherein the first color re-use pattern has fewer colors than the initial color re-use pattern.

3. The method of claim 2, wherein the initial color re-use pattern features k*n-colors, the first color re-use pattern features m*n-colors, and wherein k and m are integers, m<k, and n is an even integer.

4. The method of claim 1, wherein the second operating mode employs intra-beam geographic sub-division for the one or more spot beams, and wherein the one or more spot beams has a coverage area and division between an inner region and an outer region is determined based on a selected carrier-to-interference contour within the coverage area.

5. The method of claim 1, wherein the second operating mode employs intra-beam geographic sub-division for the one or more spot beams, and wherein the outer region is a ring around the inner region.

6. The method of claim 1, wherein the second operating mode employs intra-beam geographic sub-division for the one or more spot beams, and wherein the outer region includes two outer regions on either side of the inner region.

7. The method of claim 1, wherein precoding downlink signals onboard the satellite includes receiving channel gain measurements from each user terminal operating in the same spectrum as said at least one of the spot beams, and updating the complex weighting vector based on the received channel gain measurements from the user terminals.

8. The method of claim 7, wherein the complex weighting vector is determined through solving an optimization problem expressed as:

$$\underset{\Sigma\|w\|^2 < P}{\text{maximize}} \sum_{j=1}^{N} c_j \log_2(1 + SINR_j),$$

wherein w is the complex weighting vector, j is an index, N is the number of user terminals operating in the same spectrum as said at least one of the spot beams, $c_j$ is a weighting factor, P is a maximum power constraint of a digital processor that is to do the precoding onboard the satellite, and $SINR_j$ is a signal-to-interference-plus-noise ratio.

9. The method of claim 8, wherein the optimization problem is to be solved in response to determining that accumulated changes in the received channel gain measurements exceed a preset value.

10. The method of claim 1, wherein the second operating mode includes the intra-beam geographic sub-division and not the precoding downlink signal, and wherein the method further comprises:
    determining, while in the second operating mode, that the spectrum fill rate exceeds a second threshold higher than the first threshold, and based on that determination, automatically causing the satellite to operate in a third operating mode that employs the precoding downlink signals onboard the satellite through application of the complex weighting vector to symbols in the downlink transmission for the at least one of the spot beams.

11. The method of claim 10, further comprising:
    determining, while in the second operating mode, that the spectrum fill rate falls below a third threshold lower than the first threshold and, on that basis, automatically causing the satellite to transition back to operating in the first operating mode.

12. The method of claim 10, further comprising:
    determining, while in the third operating mode, that the spectrum fill rate falls below a fourth threshold lower than the second threshold but higher than the first threshold and, on that basis, automatically transitioning the satellite back to the second operating mode.

13. The method of claim 1, wherein said causing the satellite to operate in the first operating mode includes sending an instruction from a ground network operations center to the satellite, and wherein said determining is performed by the ground network operations center.

14. A high throughput satellite, comprising:
    a plurality of downlink spot beams; and
    a digital processor to
    operate the satellite in a first operating mode that employs a first color re-use pattern for downlink transmissions,
    determine that a spectrum fill rate exceeds a first threshold, and
    based on the determination that the spectrum fill rate exceeds the first threshold, automatically transition the satellite to a second operating mode that employs at least one of
    intra-beam geographic sub-division of one or more spot beams into an inner region and an outer region, wherein the inner region uses the first color re-use pattern and the outer region uses a second color re-use pattern having more colors than the first color re-use pattern, and
    precoding downlink signals onboard the satellite through application of a complex weighting vector to symbols in the downlink transmission for at least one of the spot beams.

15. The high throughput satellite of claim 14, wherein, when in the first mode of operation, the digital processor is to initiate operation of the satellite using an initial color re-use pattern, determine that the spectrum fill rate exceeds an initial threshold, and, based on that determination, change the operation of the satellite to use the first color re-use pattern, wherein the first color re-use pattern has fewer colors than the initial color re-use pattern.

16. The high throughput satellite of claim 15, wherein the initial color re-use pattern features k*n-colors, the first color re-use pattern features m*n-colors, and wherein k and m are integers, m<k, and n is an even integer.

17. The high throughput satellite of claim 14, wherein the second operating mode employs intra-beam geographic sub-division for the one or more spot beams, and wherein the one or more spot beams has a coverage area and division between an inner region and an outer region is determined based on a selected carrier-to-interference contour within the coverage area.

18. The high throughput satellite of claim 14, wherein the second operating mode employs intra-beam geographic sub-division for the one or more spot beams, and wherein the outer region is a ring around the inner region.

19. The high throughput satellite of claim 14, wherein the second operating mode employs intra-beam geographic sub-division for the one or more spot beams, and wherein the outer region includes two outer regions on either side of the inner region.

20. The high throughput satellite of claim 14, wherein the digital processor is to precode downlink signals onboard the satellite by receiving channel gain measurements from each user terminal operating in the same spectrum as said at least one of the spot beams, and updating the complex weighting vector based on the received channel gain measurements from the user terminals.

21. The high throughput satellite of claim 20, wherein the complex weighting vector is to be determined by the digital processor through solving an optimization problem expressed as:

$$\underset{\Sigma \|w\|^2 < P}{\text{maximize}} \sum_{j=1}^{N} c_j \log_2(1 + SINR_j),$$

wherein w is the complex weighting vector, j is an index, N is the number of user terminals operating in the same spectrum as said at least one of the spot beams, $c_j$ is a weighting factor, P is a maximum power constraint of a digital processor that is to do the precoding onboard the satellite, and $SINR_j$ is a signal-to-interference-plus-noise ratio.

22. The high throughput satellite of claim 21, wherein the digital processor is to solve the optimization problem in response to determining that accumulated changes in the received channel gain measurements exceed a preset value.

23. The high throughput satellite of claim 14, wherein the second operating mode includes the intra-beam geographic sub-division and not the precoding downlink signal, and wherein the digital processor is further to:
determine, while in the second operating mode, that the spectrum fill rate exceeds a second threshold higher than the first threshold, and based on that determination, automatically transition the satellite to a third operating mode that employs the precoding downlink signals onboard the satellite through application of the complex weighting vector to symbols in the downlink transmission for the at least one of the spot beams.

24. The high throughput satellite of claim 23, wherein the digital processor is further to:
determine, while in the second operating mode, that the spectrum fill rate falls below a third threshold lower than the first threshold and, on that basis, automatically transition the satellite back to the first operating mode.

25. The high throughput satellite of claim 23, wherein the digital processor is further to:
determine, while in the third operating mode, that the spectrum fill rate falls below a fourth threshold lower than the second threshold but higher than the first threshold and, on that basis, automatically transition the satellite back to the second operating mode.

26. A network operations center for controlling operation of a high throughput satellite in orbit, the satellite having a plurality of downlink spot beams and a plurality of operating modes, the network operations center comprising:
a high speed telemetry and command link to the satellite;
at least one processor; and
memory storing processor-executable instructions that, when executed by the at least one processor, cause the processor to:
instruct the satellite to operate in a first operating mode that employs a first color re-use pattern for downlink transmissions,
determine that a spectrum fill rate for the satellite exceeds a first threshold; and
based on the determination that the spectrum fill rate exceeds the first threshold, automatically instruct the satellite to operate in a second operating mode that employs at least one of
intra-beam geographic sub-division of one or more spot beams into an inner region and an outer region, wherein the inner region uses the first color re-use pattern and the outer region uses a second color re-use pattern having more colors than the first color re-use pattern, and
precoding downlink signals onboard the satellite through application of a complex weighting vector to symbols in the downlink transmission for at least one of the spot beams.

* * * * *